US012320108B2

(12) United States Patent
Wei

(10) Patent No.: US 12,320,108 B2
(45) Date of Patent: Jun. 3, 2025

(54) WATERWAY INSTALLATION STRUCTURE IN A TOILET

(71) Applicant: Shanghai Kohler Electronics, Ltd., Shanghai (CN)

(72) Inventor: Xiaohua Wei, Shanghai (CN)

(73) Assignee: Shanghai KOHLER Electronics, Ltd., Shanghai (CN)

( * ) Notice: Subject to any disclaimer, the term of this patent is extended or adjusted under 35 U.S.C. 154(b) by 0 days.

(21) Appl. No.: 18/244,033

(22) Filed: Sep. 8, 2023

(65) Prior Publication Data

US 2024/0093477 A1  Mar. 21, 2024

(30) Foreign Application Priority Data

Sep. 15, 2022 (CN) .......................... 202222448019.5

(51) Int. Cl.
| | | |
|---|---|---|
| E03D 11/17 | (2006.01) | |
| F16L 9/00 | (2006.01) | |
| E03B 1/04 | (2006.01) | |
| F16L 5/10 | (2006.01) | |
| F16L 9/02 | (2006.01) | |
| F16L 9/12 | (2006.01) | |
| F16L 37/08 | (2006.01) | |
| F16L 37/098 | (2006.01) | |
| F16L 37/16 | (2006.01) | |

(52) U.S. Cl.
CPC .............. *E03D 11/17* (2013.01); *F16L 9/003* (2013.01); *E03B 2001/045* (2013.01); *F16L 5/10* (2013.01); *F16L 9/02* (2013.01); *F16L 9/12* (2013.01); *F16L 37/08* (2013.01); *F16L 37/098* (2013.01); *F16L 37/16* (2013.01)

(58) Field of Classification Search
CPC ... E03D 11/17; F16L 9/003; F16L 9/02; F16L 9/12; F16L 5/10; F16L 37/08; F16L 37/098; F16L 37/16; E03B 2001/045
USPC ........ 137/15.09, 269, 270; 4/445, 448, 328, 4/340, 353, 417, 418; 285/81, 87, 242, 285/255, 290.4
See application file for complete search history.

(56) References Cited

U.S. PATENT DOCUMENTS

| | | | | |
|---|---|---|---|---|
| 3,989,058 A | * | 11/1976 | Jackson ............... | G05D 23/185 137/625.48 |
| 4,177,835 A | * | 12/1979 | Paley .................. | A61M 39/223 251/96 |
| 4,494,568 A | * | 1/1985 | Young ................ | G01L 19/0015 137/561 A |

(Continued)

*Primary Examiner* — Minh Q Le
(74) *Attorney, Agent, or Firm* — Lempia Summerfield Katz LLC

(57) ABSTRACT

A waterway installation structure in a toilet includes a connection module. The connection module includes a module body including a watercourse and includes at least two connection pipe joints disposed on the module body and in fluid communication with the watercourse. The waterway installation structure in the toilet also includes at least two waterway modules. The at least two waterway modules include at least two waterway joints configured to be respectively connected to the at least two connection pipe joints. The at least two waterway joints are configured to be respectively inserted into the at least two connection pipe joints, or the at least two connection pipe joints are configured to be respectively inserted into the at least two waterway joints.

21 Claims, 8 Drawing Sheets

(56) References Cited

U.S. PATENT DOCUMENTS

| | | | | |
|---|---|---|---|---|
| 5,579,542 | A | * | 12/1996 | Hayman ................ E03D 5/00 4/328 |
| 5,799,986 | A | * | 9/1998 | Corbett .............. F16L 37/091 285/305 |
| 6,755,446 | B2 | * | 6/2004 | Mintz .................. E03C 1/20 285/376 |
| 2001/0013700 | A1 | * | 8/2001 | Mintz ................ F16L 37/113 285/360 |
| 2005/0120471 | A1 | * | 6/2005 | Lim .................. A47K 13/00 4/448 |
| 2017/0045169 | A1 | * | 2/2017 | Gibelin ............ F16L 37/0841 |
| 2017/0152981 | A1 | * | 6/2017 | Sato .................. F16L 37/098 |
| 2018/0066783 | A1 | * | 3/2018 | Bunn, Sr. .............. F16L 21/03 |
| 2020/0041059 | A1 | * | 2/2020 | Genoni .............. F24D 3/1066 |
| 2022/0325514 | A1 | * | 10/2022 | Shahar ................ E03D 11/14 |
| 2023/0121701 | A1 | * | 4/2023 | Casura .............. F16L 37/098 285/305 |
| 2023/0151917 | A1 | * | 5/2023 | Gu .................... F16L 37/098 285/87 |
| 2023/0265957 | A1 | * | 8/2023 | Hsieh ................ F16L 37/413 285/316 |

* cited by examiner

WATERWAY INSTALLATION STRUCTURE IN A TOILET

CROSS REFERENCE TO RELATED APPLICATION

This application claims the benefit of priority to: Chinese Patent Application No. 202222448019.5 filed in the Chinese Intellectual Property Office on Sep. 15, 2022, which is hereby incorporated by reference in its entirety.

FIELD

The present disclosure relates to the technical field of toilet, and particularly relates to a waterway installation structure in a toilet.

BACKGROUND

Many waterway modules may be mounted in a back base of a smart toilet, for example, a water purification module, a spray pipe module, a waterway switching module, etc. These modules need to be connected to each other through a water pipe in order to achieve waterway connection.

The waterway modules that need to be connected to each other are connected through a silicone hose. A certain amount of interference should be left when a silicone hose is cooperated or engaged with a joint, and the hose needs to be used in conjunction with a clamp in the process of assembly to achieve a sealed connection.

Generally, installation spaces of the waterway modules are small, and the user's hand is difficult to reach into the installation space to conduct the installation. The installation method by using the hose and the clamp is time-consuming and laborious, and the working hour is long. A sufficient bending space needs to be reserved at the connection of the hose to accommodate extra hoses. This takes up a lot of space.

SUMMARY

The present disclosure aims to overcome the above defects and provides a novelty waterway installation structure in a toilet, which comprises a connection module that is easy to be assembled and takes up small space.

An embodiment of the present disclosure provides a waterway installation structure in a toilet, comprising at least two waterway modules and a connection module (e.g., a hard connection module or a connection module made from hard material) configured to be connected to the two waterway modules.

Each of the waterway modules comprises a waterway joint.

The connection module comprises a module body comprising a watercourse and comprises at least two connection pipe joints disposed on the module body. Each of the connection pipe joints is in communication with (e.g., in fluid communication with) the watercourse.

The waterway joint of each waterway module is connected to and sealed with one connection pipe joint of the at least two connection pipe joints.

The waterway joint is plugged (e.g., inserted) into the connection pipe joint, or the connection pipe joint is plugged (e.g., inserted) into the waterway joint.

In another embodiment of the present disclosure, a seal ring is disposed between the waterway joint and the connection pipe joint.

In another embodiment of the present disclosure, the waterway joint or the connection pipe joint comprises a limit groove, and the seal ring is assembled or disposed in the limit groove.

In another embodiment of the present disclosure, the connection pipe joint is formed integrally with the module body.

In another embodiment of the present disclosure, the module body is provided with a body jaw disposed on a side of each connection pipe joint, The waterway module comprises a limit block disposed on a side of each waterway joint.

The body jaw is in snap-fit connection with the limit block.

In another embodiment of the present disclosure, the waterway installation structure further comprises a structural base, and the structural base comprises a mounting groove configured to mount the module body.

The module body is removably mounted in the mounting groove.

In another embodiment of the present disclosure, the structural base is provided with at least one positioning pin around the mounting groove. Correspondingly, the module body is provided with at least one positioning lug plate.

Each of the at least one positioning lug plate comprises a positioning hole configured to cooperate with the at least one positioning pin.

The positioning lug plate is disposed on an outside of the mounting groove, and each of the at least one positioning pin passes through one corresponding positioning hole with a in clearance therebetween.

In another embodiment of the present disclosure, the mounting groove is provided with the at least one positioning pin disposed on each of opposite sides of the mounting groove. Correspondingly, the module body is provided with the at least one positioning lug plate disposed on each of opposite sides of the module body.

In another embodiment of the present disclosure, the structural base is provided with at least one base jaw around the mounting groove, and the base jaw is in snap-fit connection with the module body.

In another embodiment of the present disclosure, the mounting groove is provided with the at least one base jaw disposed on each of opposite sides of the mounting groove. Each of the base jaws is in snap-fit connection with the module body.

By adopting the technical solutions above, the present disclosure has the following beneficial effects:

According to the waterway installation structure in a toilet provided by the present disclosure, the connection module is adopted, the waterway module comprises the waterway joint, and the connection module comprises the connection pipe joint. When the waterway installation structure is connected or assembled, the waterway joint may be directly inserted into the connection pipe joint to achieve a sealed connection, or the connection pipe joint may be directly inserted into the waterway joint to achieve a sealed connection. It is easy to assemble the waterway installation structure, and thus time and effort may be saved. The connection module does not take up extra installation space but takes up small space. This is convenient for structural arrangement. The connection module plays a structural connection role between the two waterway modules and helps to improve the stability of the connection between the two waterway modules.

In summary, the waterway installation structure in the toilet provided by the present disclosure is easy to be assembled, saves the installation space, and also improves the structural stability.

BRIEF DESCRIPTION OF THE FIGURES

With reference to the drawings, the contents disclosed by the present disclosure should be more easily understood. It should be understood that these drawings are merely used for illustration and are not intended to limit the protection scope of the present disclosure. In the drawings.

DETAILED DESCRIPTION

Figure 1:
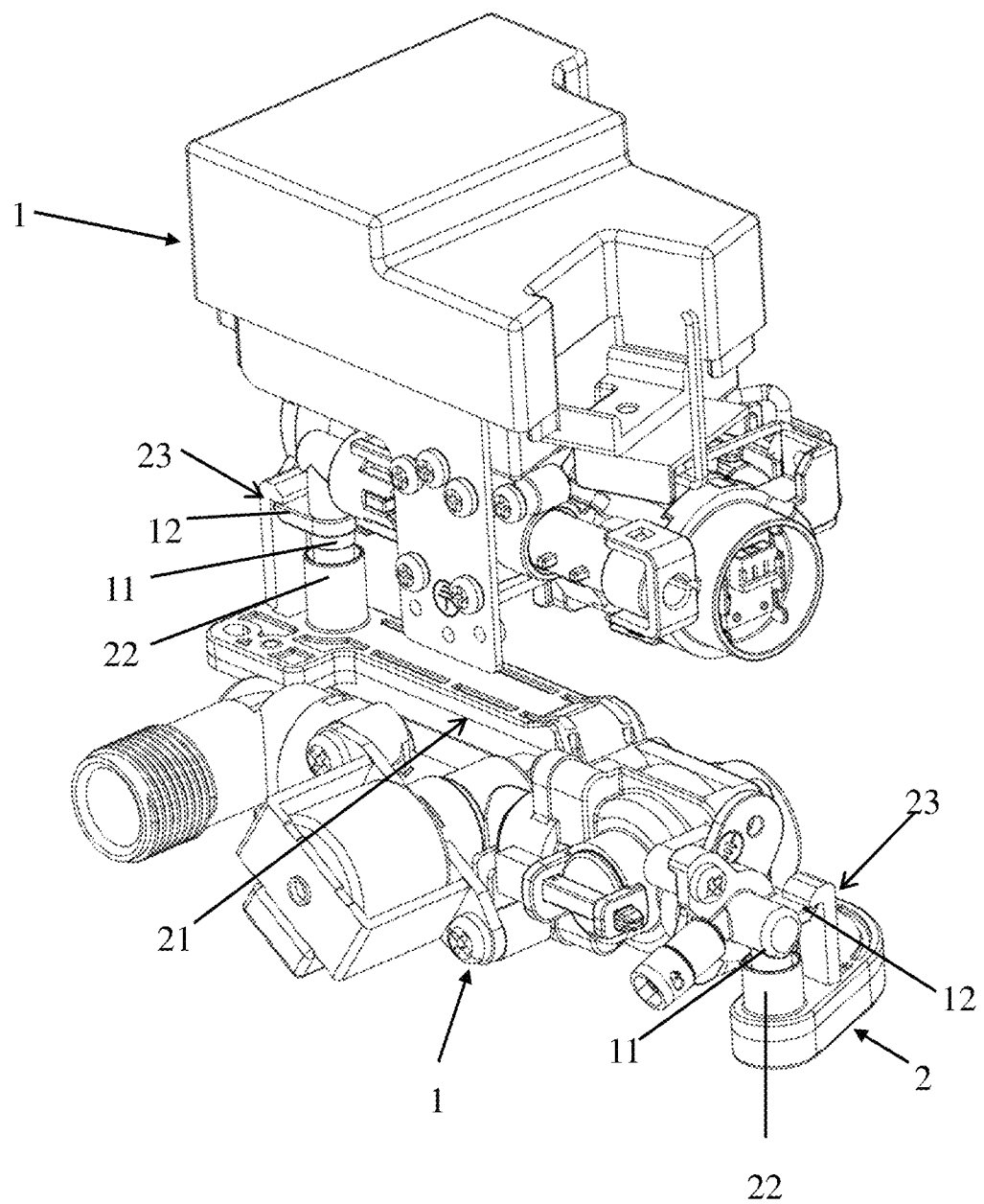
FIG. 1 is a perspective view of a waterway installation structure in the toilet according to an example of the present disclosure.

The specific embodiments of the present disclosure are further described with reference to the drawings hereinafter. Same or equivalent parts are denoted by same reference numerals. It should be noted that the terms "front", "back", "left", "right", "up" and "down" used in the following description refer to the directions in the drawings, and the terms "inner" and "outer" refer to the directions towards or far away from geometric centers of specific parts respectively.

Figure 2:
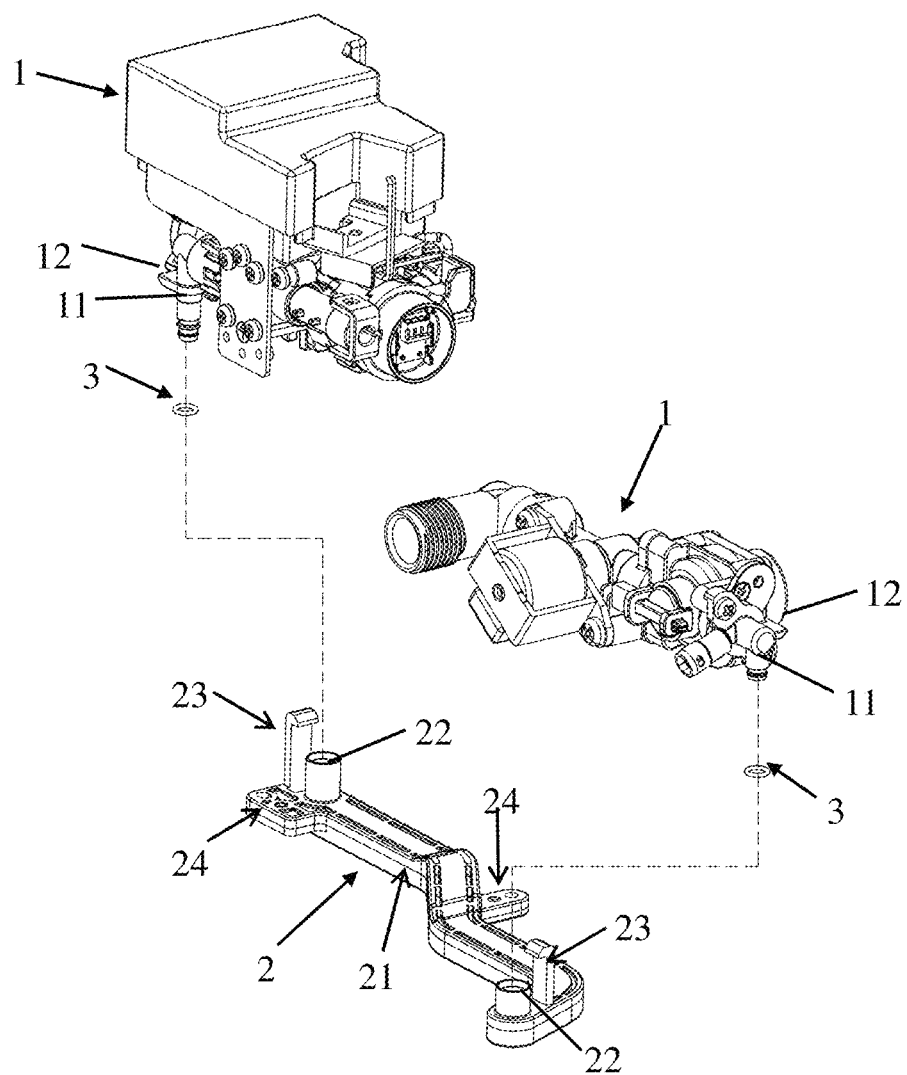
FIG. 2 is an exploded view of the waterway installation structure in the toilet shown in FIG. 1.
Figure 3:
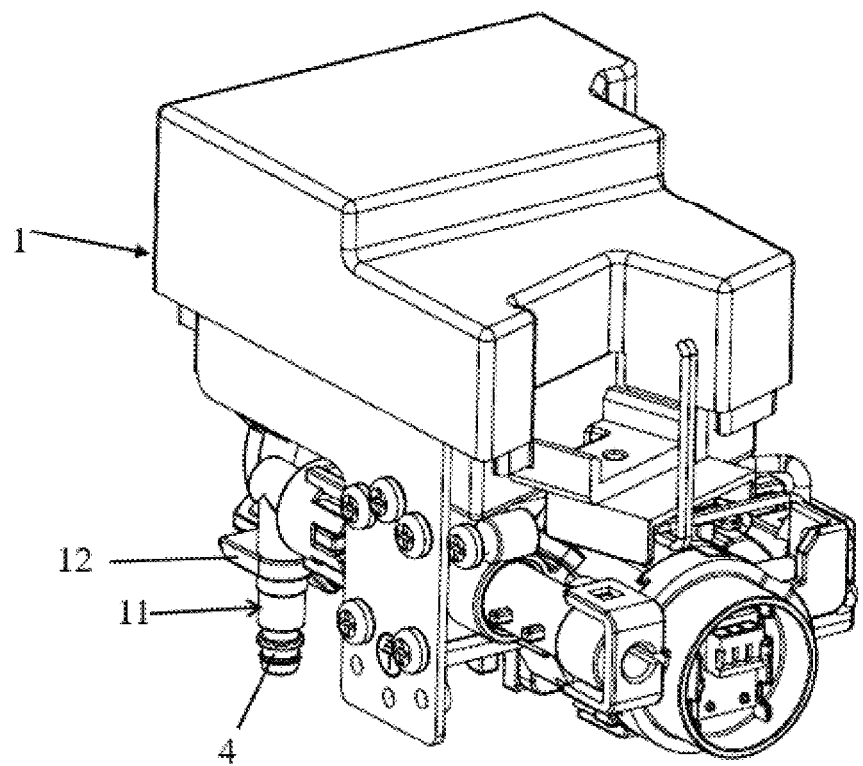
FIG. 3 is a perspective view of a waterway module of a structure.
Figure 4:
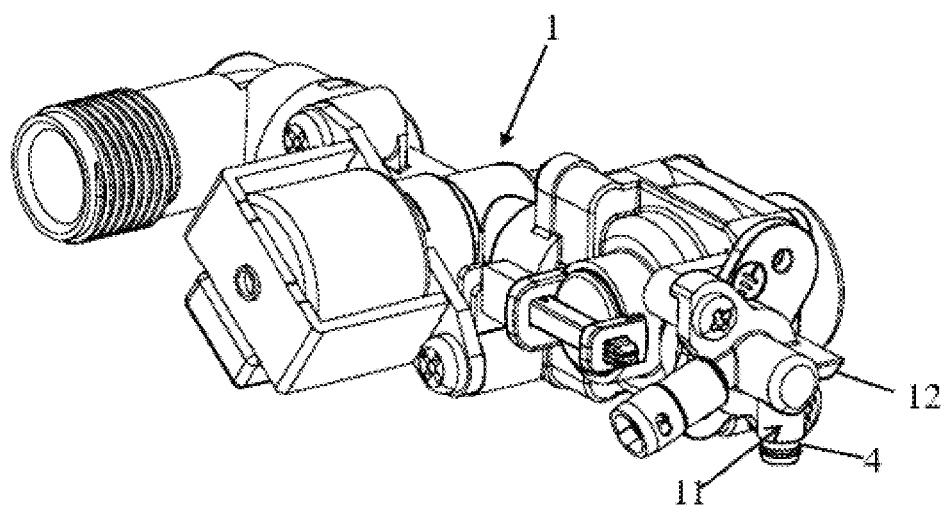
FIG. 4 is a perspective view of a waterway module of another structure.
Figure 5:
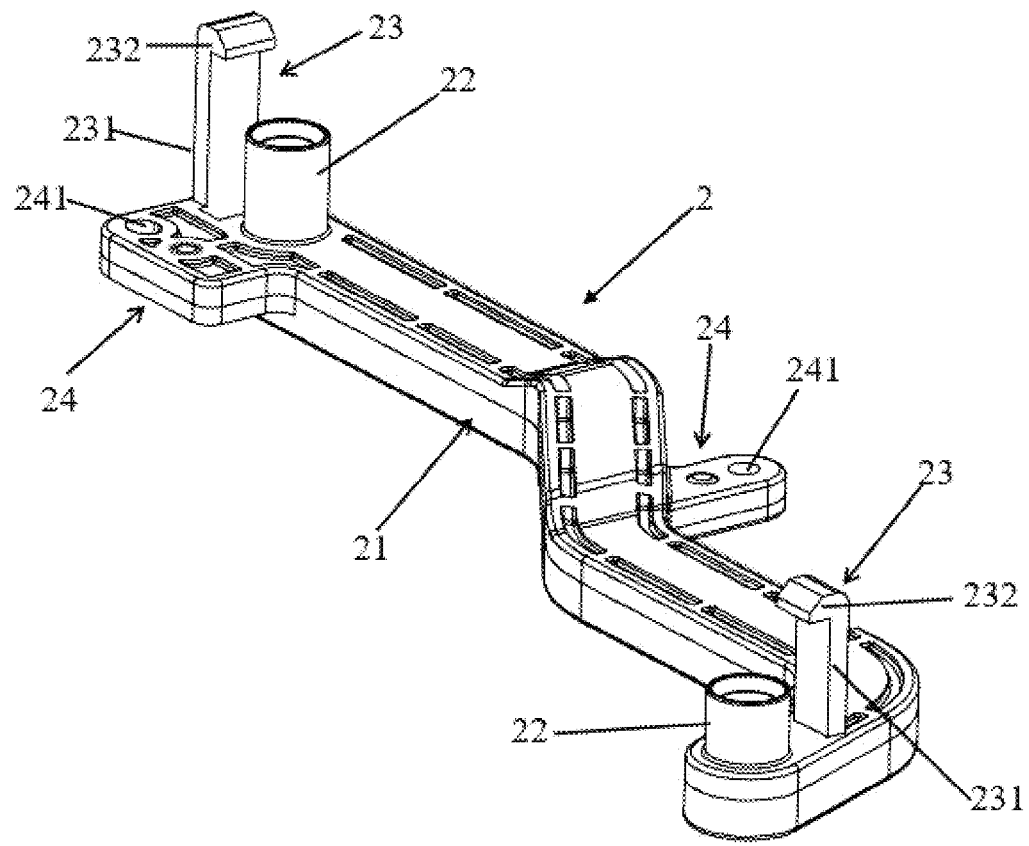
FIG. 5 is a perspective view of a connection module.
Figure 6:
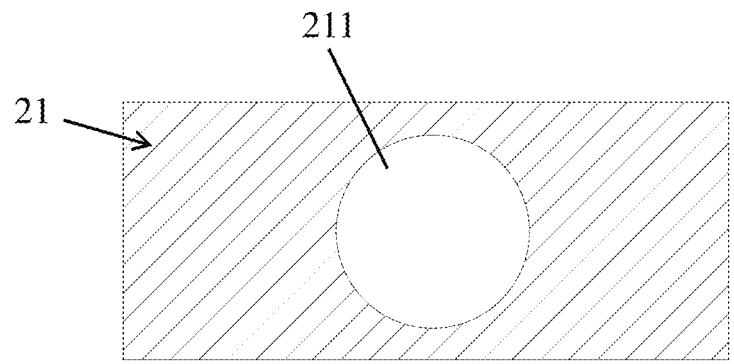
FIG. 6 is a sectional view of a module body with a watercourse.

FIG. 1 is a perspective view of a waterway installation structure in the toilet according to an example of the present disclosure. FIG. 2 is an exploded view of the waterway installation structure in the toilet shown in FIG. 1. FIG. 3 is a perspective view of a waterway module of a structure. FIG. 4 is a perspective view of a waterway module of another structure. FIG. 5 is a perspective view of a connection module. FIG. 6 is a sectional view of a module body with a watercourse. As shown in FIGS. 1-6, a waterway installation structure in a toilet according to an embodiment of the present disclosure comprises at least two waterway modules 1 and a hard connection module 2 configured to be connected to the at least two waterway modules 1.

Each waterway module 1 comprises a waterway joint 11.

The hard connection module 2 comprises a module body 21 comprising a watercourse 211 and comprises at least two connection pipe joints 22 disposed on the module body 21. Each of the connection pipe joints 22 is in communication with (e.g., in fluid communication with) the watercourse 211.

The waterway joint 11 on each waterway module 1 is connected to and sealed with one connection pipe joint 22.

The waterway joint 11 is plugged (e.g., inserted) into the connection pipe joint 22, or the connection pipe joint 22 is plugged (e.g., inserted) into the waterway joint 11.

The present disclosure provides a waterway installation structure mainly used in the toilet. Specifically, the waterway installation structure may be mounted in a back base of the toilet or a water tank. The back base used in this present disclosure may a mounting base of a toilet cover.

The waterway installation structure comprises the waterway module 1 and the hard connection module 2. The waterway module 1 may be a water-using device, such as a motor, a water purifier, a spray pipe, etc. The waterway module 1 may also be a water-passing device, such as a water valve, pipe fitting, etc. The waterway module 1 may also be a combination of the water-using devices and the water-passing devices.

The waterway installation structure comprises at least two waterway modules 1. Each waterway module 1 comprises a waterway joint 11. The waterway joint 11 may be an inlet or outlet of the waterway module 1, and specific settings may be made according to actual needs. When the at least two waterway modules 1 are connected to a connection module 2 (e.g., a hard connection module or a connection module made from hard material). One waterway joint 11 of one of the at least two waterway modules 1 is an outlet of the corresponding waterway module 1, a waterway joint 11 of the other waterway module 1 of the at least two waterway modules 1 is an inlet of the corresponding waterway module 1.

When two waterway modules 1 need to achieve waterway connection, the hard connection module 2 may be used for the connection.

The hard connection module 2 may be a plastic connection module or a metal connection module. Compared to the rubber hose, the plastic connection module or the metal connection module is harder in texture and will not bend. Thus, the hard connection module 2 may be called "hard connection module."

The hard connection module 2 comprises a module body 21 and at least two connection pipe joints 22. As needed, the module body 21 may be configured in an elongated shape with a watercourse 211 inside. The number of the connection pipe joints 22 is configured according to the number of waterway joints 11 to be connected. The at least two connection pipe joints 22 are connected to the module body 21, and each connection pipe joint 22 is in communication with (e.g., in fluid communication with) the watercourse 211.

In this present disclosure, both the waterway joint 11 and the connection pipe joint 22 are cylindrical.

According to actual needs, an outer diameter of the waterway joint 11 may be set to be slightly smaller than an inner diameter of the connection pipe joint 22, so that the waterway joint 11 can be directly plugged into the connection pipe joint 22 to achieve the connection.

According to actual needs, alternatively the outer diameter of the connection pipe joint 22 may be set to be slightly smaller than the inner diameter of the waterway joint 11, so that the connection pipe joint 22 can be directly plugged into the waterway joint 11 to achieve the connection.

When the waterway installation structure is assembled, the waterway joint 11 on each waterway module 1 may be directly plugged into the corresponding connection pipe joint 22 to achieve a sealed connection, or each connection pipe joint 22 of the hard connection module 2 may be plugged into the corresponding waterway joint 11 to achieve a sealed connection.

As needed, a tapered sealing surface is provided on surfaces (e.g., mating surfaces) of the at least two waterway joints 11 and the at least two connection pipe joints 22 to achieve automatic sealing after the waterway joint 11 is plugged into the connection pipe joint 22 or the connection pipe joint 22 is plugged into the waterway joint 11.

It is also possible to coat sealant onto the mating surfaces of the waterway joint 11 and the connection pipe joint 22, as needed, to achieve automatic sealing after the waterway joint 11 is plugged into the connection pipe joint 22 or the connection pipe joint 22 is plugged into the waterway joint 11.

The waterway installation structure in the toilet provided in the present disclosure adopts the hard connection module 2. When the waterway installation structure is connected or assembled, the waterway joint 11 may be directly inserted into the connection pipe joint 22 to achieve a sealed connection, or the connection pipe joint 22 may be directly inserted into the waterway joint 11 to achieve a sealed connection. It is easy to assemble the waterway installation structure, and thus time and effort may be saved. The hard connection module 2 does not take up extra installation space but takes up small space. This is convenient for structural arrangement. The hard connection module 2 plays a structural connection role between the two waterway modules 1 and helps to improve the stability of the connection between the two waterway modules 1.

In summary, the waterway installation structure in the toilet provided by the present disclosure is easy to be assembled, saves the installation space, and also improves the structural stability.

In an embodiment, as shown in FIG. 2, a seal ring 3 is disposed between the waterway joint 11 and the connection pipe joint 22 to further improve sealing performance. The seal ring 3 is a rubber seal ring.

In an embodiment, as shown in FIGS. 3 and 4, the waterway joint 11 or the connection pipe joint 22 comprises a limit groove 4, and the seal ring 3 is assembled or disposed in the limit groove 4 to improve the assembly stability of the seal ring 3.

If the waterway joint 11 is plugged into the connection pipe joint 22, the limit groove 4 is configured or disposed on an outer periphery surface of the waterway joint 11.

If the connection pipe joint 22 is plugged into the waterway joint 11, the restriction groove 4 is configured or disposed on an outer peripheral surface of the connection pipe joint 22.

In an embodiment, the connection pipe joint 22 is formed integrally with the module body 21, resulting in high structural strength. If the hard connection module 2 is a hard plastic component, the connection pipe joint 22 is formed integrally with the module body 21 by injection molding. If the hard connection module 2 is a metal component, the connection pipe joint 22 is formed integrally with the module body 21 by casting.

In an embodiment, as shown in FIGS. 1-5, the module body 21 is provided with a body jaw 23 disposed on a side of each connection pipe joint 22.

The waterway module 1 comprises a limit block 12 disposed on a side of the waterway joint 11.

The body jaw 23 is in snap-fit connection with the limit block 12.

In this embodiment, the hard connection module 2 comprises the body jaw 23 to provide a limit to the module body 21. The body jaw 23 is connected to the module body 21, and the body jaw 23 and the module body 21 may be formed integrally. The body jaw 23 extends from the module body 21 toward the waterway module 1.

Specifically, one body jaw 23 is disposed on the side of each connection pipe joint 22.

Each waterway module 1 comprises one limit block 12, and the limit block 12 extends horizontally or laterally. The limit block 12 may be formed integrally with the waterway module 1. The limit block 12 is disposed on the side of the waterway joint 11.

When the waterway installation structure is assembled, each body jaw 23 on the hard connection module 2 is snapped onto limit block 12 of one waterway module 1 to improve the assembly stability of the hard connection module 2 and the waterway module 1.

In an embodiment, the hard connection module 2 is disposed under or below the waterway module 1, and the body jaw 23 is disposed on a top surface of the module body 21.

Specifically, the body jaw 23 comprises a standing plate 231 connected to the module body 21 and a hanging plate 232 connected to a top of the standing plate 231 and extending toward a side of the standing plate 231. The hanging plate 232 is hung on the limit block 12 when the hard connection module 2 is assembled to the waterway module 1.

As needed, a top surface of the hanging plate 232 and a bottom surface of the limit block 12 each may be configured with or comprise a corresponding bevel. When the hard connection module 2 is assembled with the waterway module 1, the standing plate 231 is deformed under the action of the bevel, so that the hanging plate 232 may move onto the limit block 12, and thus the hanging plate 232 may automatically hang on the limit block 12 after the reset of the standing plate 231.

Figure 7:
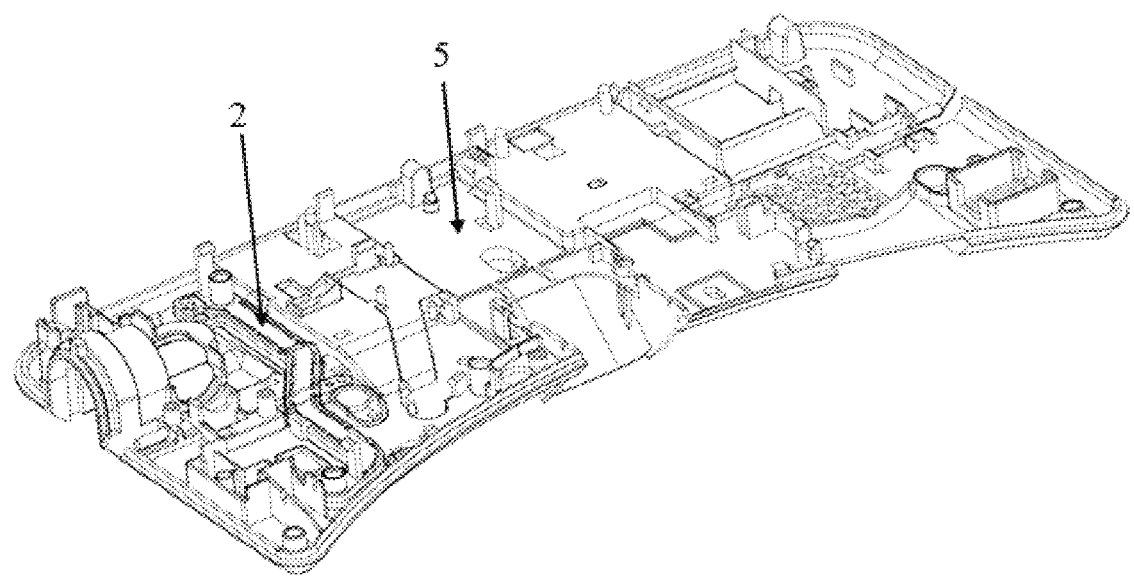
FIG. 7 is a perspective view of the connection module connected to a structural base.
Figure 8:
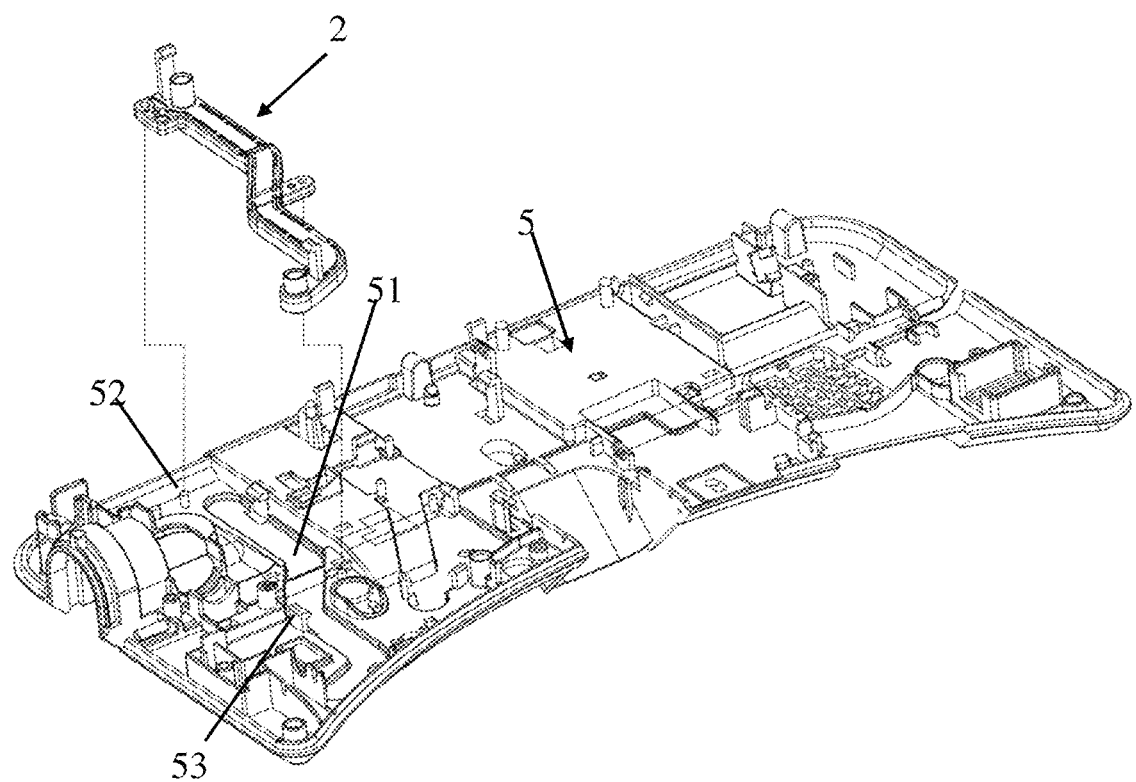
FIG. 8 is an exploded view of the connection module connected to the structural base.
Figure 9:
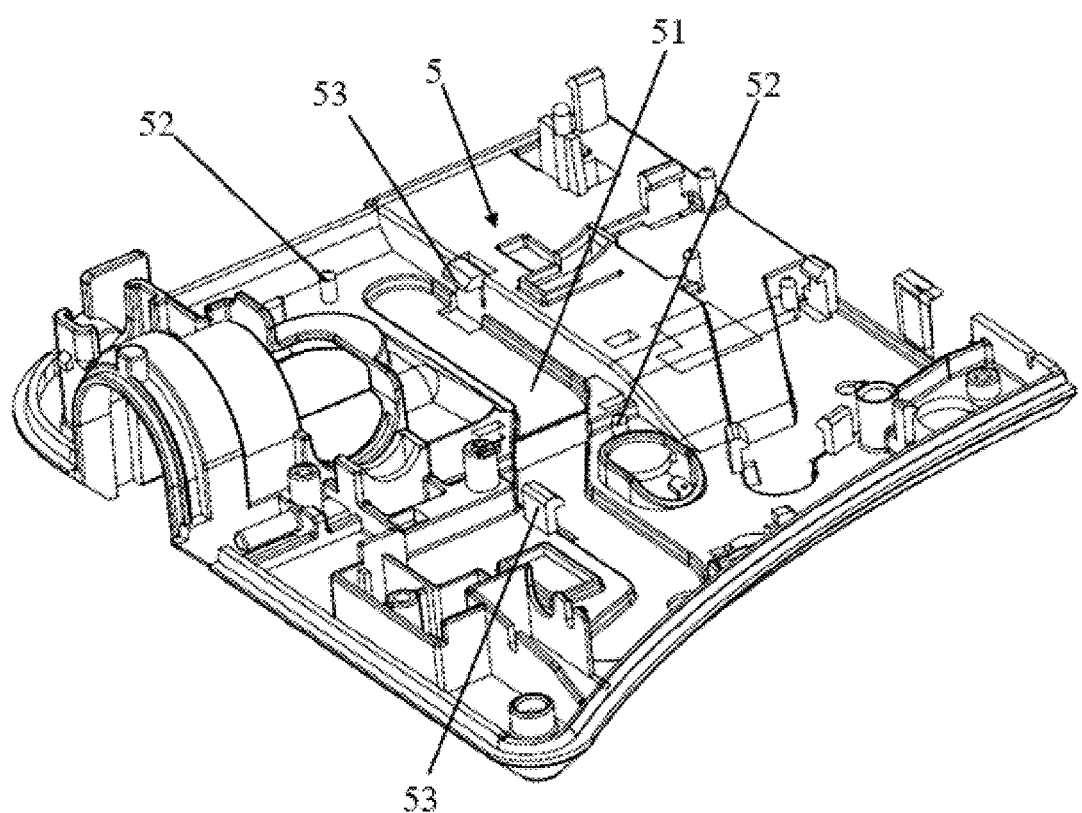
FIG. 9 is a partially enlarged view of the structural base.
Figure 10:
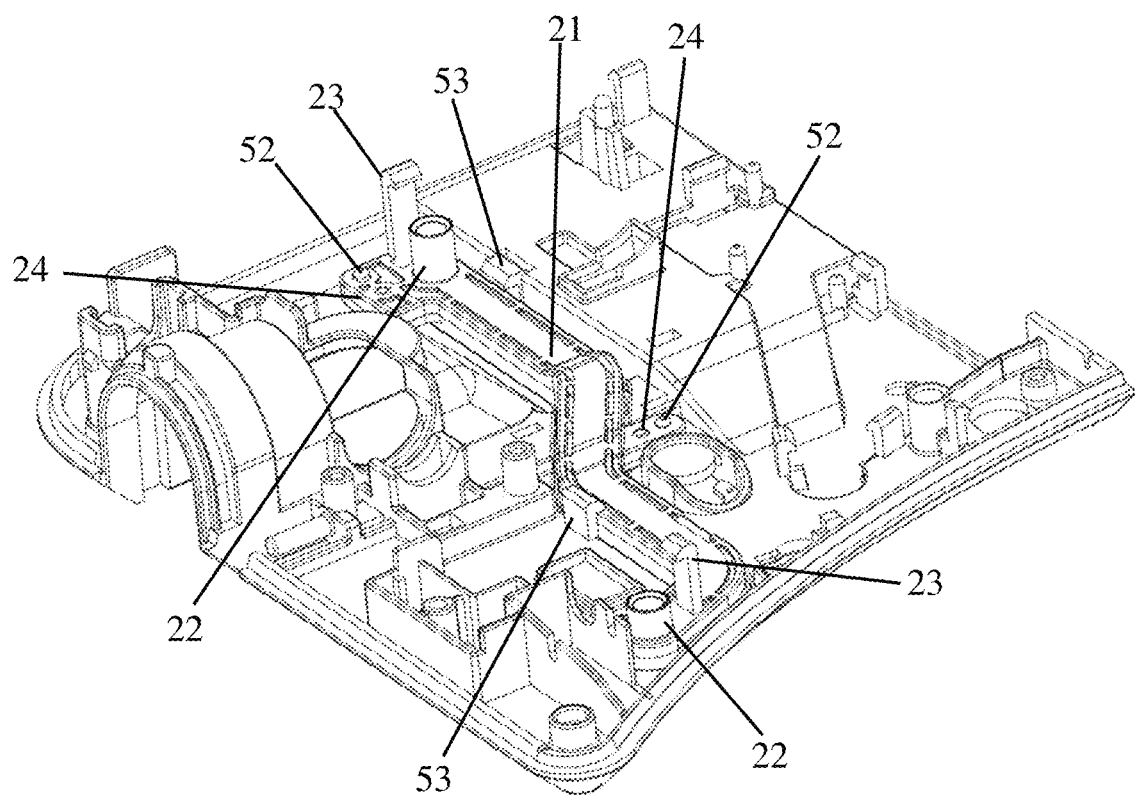
FIG. 10 is an enlarged view of the connection module connected to the structural base.

FIG. 7 is a perspective view of the connection module connected to a structural base. FIG. 8 is an exploded view of the connection module connected to the structural base. FIG. 9 is a partially enlarged view of the structural base. FIG. 10 is an enlarged view of the connection module connected to the structural base. In an embodiment, as shown in FIGS. 7-10, the waterway installation structure also comprises a structural base 5 comprising a mounting groove 51 configured to mount the module body 21. The module body 21 is removably mounted in the mounting groove 51.

In this embodiment, the waterway installation structure comprises the structural base 5, and the structural base 5 may be a pedestal of a back base of a toilet or toilet bidet.

The structural base 5 has the mounting groove 51, which matches the shape contour of the module body 21, and the module body 21 is removably mounted in the mounting groove 51, enhancing the installation stability of the hard connection module 2.

In this present disclosure, the at least two hard connection modules 2 have installation positions at a top surface of the structural base 5, and the module body 21 is installed in the mounting groove 51 of the structural base 5 to further improve the stability of the waterway installation structure.

In an embodiment, as shown in FIGS. 7-10, at least one positioning pin 52 is disposed configured on the structural base 5 around the mounting groove 51. Correspondingly, at least one positioning lug plate 24 is disposed on the module body 21.

Each of the positioning lug plates 24 comprises a positioning hole 241 configured to cooperate with (e.g., receive) the positioning pin 52.

The positioning lug plate 24 is disposed on an outside of the mounting groove 51, and each of the positioning pins 52 passes through the one positioning hole 241 with a clearance therebetween.

In this embodiment, at least one positioning pin 52 is disposed on the structural base 5, and the positioning pin 52 is disposed on the outside of the mounting groove 51. The module body 21 is correspondingly provided with at least one positioning lug plate 24. The positioning lug plate 24 extends laterally from the module body 21, which may be formed integrally with the module body 21. Each of the positioning lugs 24 has at least one positioning hole 241, which is used to cooperate with the positioning pin 52 to achieve the positioning.

When the waterway installation structure is assembled, the positioning lug plate 24 is disposed on the outside of the mounting groove 51, and the positioning lug plate 24 convers the positioning pin 52. Each positioning pin 52 passes through and is in clearance fit with one positioning hole 241.

In an embodiment, as shown in FIGS. 7-10, at least one positioning pin 52 is disposed on each of the opposite sides of the mounting groove 51 respectively. Correspondingly, at least one positioning lug plate 24 is disposed on each of the opposite sides of the module body 21 respectively.

In this embodiment, the positioning pin 52 is disposed on each side of the long side of the mounting groove 51 respectively. Correspondingly, the positioning lug plate 24 is disposed on each of the two long sides of the module body 21 respectively. When the waterway installation structure is assembled, the positioning lug plate 24 is disposed on the outside of the mounting groove 51, and the positioning lug plate 24 covers the positioning pin 52. Each positioning pin 52 cooperates with the positioning hole 241 on the corresponding positioning lug plate 24 to achieve the positioning and improve the structural stability.

In an embodiment, as shown in FIGS. 7-10, the structural base 5 is provided with at least one base jaw 53 around the mounting groove 51, and the base jaw 53 is in snap-fit connection with the module body 21.

In this embodiment, the base jaw 53 is provided on the structural base 5, and the base jaw 53 is on the outside of the mounting groove 51, and the mounting groove 51 may also be provided directly on a groove wall of the mounting groove 51. The base jaw 53 may have a similar structural design to the body jaw 23.

After the module body 21 is assembled into the mounting groove 51, the snap plate or hanging plate of the base jaw 53 is snapped onto the top surface of the module body 21. Thus, the module body 21 is limited in the mounting groove 51, and the assembly stability of the module body 21 to the mounting groove 51 may be improved.

In an embodiment, as shown in FIGS. 7-10, the mounting groove 51 comprises at least one base jaw 53 disposed on each opposite sides respectively, and each of the base jaws 53 may be snapped onto the module body 21.

In this embodiment, the base jaw 53 is provided on each side of the long side of the mounting groove 51. During the assembly, the base jaws 53 on both sides are snapped onto the module body 21, and thus the assembly stability of the module body 21 may be further improved.

In an embodiment, the toilet includes a base (e.g., a pedestal, bowl, etc.) and a tank. The base is configured to be attached to another object such as a drainpipe, floor, or another suitable object. The base includes a bowl, a sump (e.g., a receptacle) disposed below the bowl, and a trapway fluidly connecting the bowl to a drainpipe or sewage line.

The tank may be supported by the base, such as an upper surface of a rim. The tank may be integrally formed with the base as a single unitary body. In other embodiments, the tank may be formed separately from the base and coupled (e.g., attached, secured, fastened, connected, etc.) to the base. The toilet may further include a tank lid covering an opening and inner cavity in the tank. The toilet may include a seat assembly including a seat and a seat cover rotatably coupled to the base. The toilet may further include a hinge assembly.

In another embodiment, the toilet may be a tankless toilet. The toilet includes a base and a seat assembly coupled to the base. The base includes a bowl, a sump disposed below the bowl, and a trapway fluidly connecting the bowl to a drainpipe or sewage line. The toilet includes a waterline that supplies the toilet with water. The toilet may further include a seat assembly including a seat and a seat cover rotatably coupled to the base. The toilets described above are provided herein as non-limiting examples of toilets that may be configured to utilize aspects of the present disclosure.

In some examples, a bidet may be included in a seat or pedestal of a toilet. In other examples, the bidet may be manufactured separately from and attached or coupled to a seat or pedestal of a toilet. The bidet includes a housing. The housing is configured to receive a flow of water through a housing inlet and dispense the flow of water from a housing outlet. The housing inlet and housing outlet may be located on opposite ends of the housing from one another, such that water may flow through the housing from the housing inlet to the housing outlet. In some examples, the housing further includes a chamber. As the housing receives the flow of water, the chamber may fill with water and provide a flow of water between the housing inlet and the housing outlet. The chamber may be configured to contain the flow of water and direct the flow of water from the housing inlet to the housing outlet. After the chamber has filled with water, the flow of water may travel along a substantially linear path between the housing inlet and the housing outlet. In some examples, one or more walls within the housing may be included to help direct a flow of water between the housing inlet and the housing outlet. The bidet may further include a housing inlet conduit configured to direct a flow of water to the housing inlet. The housing inlet conduit may be coupled to a water supply such as tank or waterline. The housing may further include a gear assembly or a portion of the gear assembly.

Figure 11:
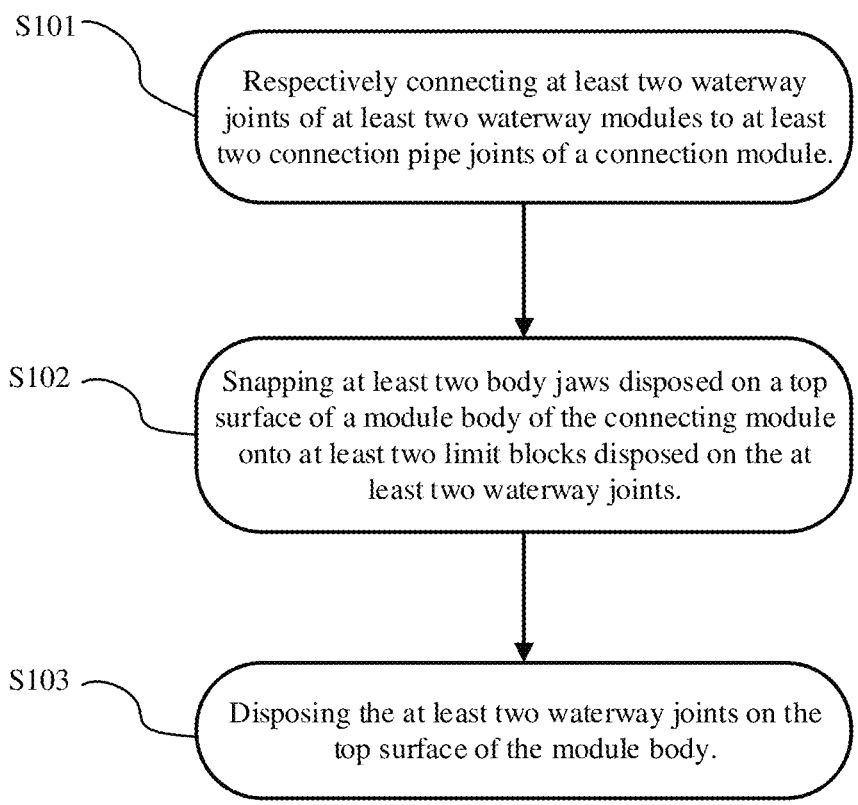
FIG. 11 is a flow chart of a method for assembling the waterway installation structure in the toilet according to an example of the present disclosure.

FIG. 11 is a flow chart of a method for assembling the waterway installation structure in the toilet according to an example of the present disclosure. The waterway installation structure in the toilet used in the method may be the waterway installation structure in the toilet according to any of the foregoing examples and may be configured to perform an operation, function, or the like as described in the present disclosure.

At act S101, the at least two waterway joints 11 of the at least two waterway modules 1 are respectively connected to the at least two connection pipe joints 22 of the connection module 2.

As noted above, the waterway joint 11 is inserted into the corresponding connection pipe joint 22, or the connection pipe joint 22 is inserted into the corresponding waterway joint 11. The seal ring 3 is disposed between the waterway joint 11 and the connection pipe joint 22 to further improve sealing performance. The seal ring 3 is a rubber seal ring. The waterway joint 11 or the connection pipe joint 22 comprises a limit groove 4, and the seal ring 3 is assembled or disposed in the limit groove 4 to improve the assembly stability of the seal ring 3. If the waterway joint 11 is inserted into the connection pipe joint 22, the limit groove 4 is configured or disposed on an outer periphery surface of the waterway joint 11. If the connection pipe joint 22 is inserted into the waterway joint 11, the restriction groove 4 is configured or disposed on an outer peripheral surface of the connection pipe joint 22.

At act S102, the at least two body jaws 23 disposed on a top surface of the module body 21 of the connecting module 2 are snapped onto the at least two limit blocks 12 disposed on the at least two waterway joints 11.

As noted above, when the waterway installation structure is assembled, each body jaw 23 on the hard connection module 2 is snapped onto limit block 12 of one waterway module 1 to improve the assembly stability of the hard connection module 2 and the waterway module 1. The body jaw 23 comprises a standing plate 231 connected to the module body 21 and a hanging plate 232 connected to a top of the standing plate 231 and extending toward a side of the standing plate 231. The hanging plate 232 is hung on the limit block 12 when the hard connection module 2 is assembled to the waterway module 1.

At act S103, the at least two waterway joints 11 are disposed on the top surface of the module body 21.

As noted above, the hard connection module 2 is disposed under or below the waterway module 1, and the body jaw 23 is disposed on a top surface of the module body 21. As needed, a top surface of the hanging plate 232 and a bottom surface of the limit block 12 each may be configured with or comprise a corresponding bevel. When the hard connection module 2 is assembled with the waterway module 1, the standing plate 231 is deformed under the action of the bevel, so that the hanging plate 232 may move onto the limit block 12, and thus the hanging plate 232 may automatically hang on the limit block 12 after the reset of the standing plate 231.

The above technical solutions may be combined as required to achieve the best technical effect.

The above are merely the principle and the preferred embodiments of the present disclosure. It should be pointed out that, for those of ordinary skills in the art, several other modifications may be made on the basis of the principle of the present disclosure, which should also be regarded as falling in the protection scope of the present disclosure.

I claim:

1. A waterway installation structure in a toilet, the waterway installation structure comprising:
    a connection module mounted to the toilet, the connection module comprising:
        a module body comprising a watercourse; and
        at least two connection pipe joints disposed on the module body and in fluid communication with the watercourse; and
    at least two waterway modules comprising:
        at least two waterway joints configured to be respectively connected to the at least two connection pipe joints,
    wherein the at least two waterway joints are configured to be respectively inserted into the at least two connection pipe joints, or
    wherein the at least two connection pipe joints are configured to be respectively inserted into the at least two waterway joints.

2. The waterway installation structure in the toilet according to claim 1, the waterway installation structure further comprising:
    a seal ring is disposed between a waterway joint of the at least two waterway joints and a corresponding connection pipe joint of the at least two connection pipe joints.

3. The waterway installation structure in the toilet according to claim 2, the waterway installation structure further comprising:
    a limit groove disposed on the waterway joint or the connection pipe joint,
    wherein the seal ring is disposed in the limit groove.

4. The waterway installation structure in the toilet according to claim 1,
    wherein the at least two connection pipe joints are formed integrally with the module body.

5. The waterway installation structure in the toilet according to claim 1, the waterway installation structure further comprising:
    a body jaw disposed on the module body and disposed on a side of each of the at least two connection pipe joints; and
    a limit block disposed on each of the at least two waterway joints,
    wherein the body jaw is connected to the limit block.

6. The waterway installation structure in the toilet according to claim 5,
    wherein the body jaw comprising:
        a standing plate connected to the module body; and
        a hanging plate connected to the standing plate,
    wherein the body jaw is disposed on a top surface of the module body, and
    wherein the at least two water modules are disposed on the top surface of the module body.

7. The waterway installation structure in the toilet according to claim 1, the waterway installation structure further comprising:
    a structural base comprising a mounting groove,
    wherein the module body is removably mounted in the mounting groove.

8. The waterway installation structure in the toilet according to claim 7, the waterway installation structure further comprising:
    at least one positioning pin disposed on the structural base and around the mounting groove,
    wherein the module body comprises at least one positioning lug plate,
    wherein the at least one positioning lug plate comprises at least one positioning hole configured to receive the at least one positioning pin, and
    wherein the positioning lug plate is disposed on an outside of the mounting groove when the at least one positioning pin passes through the at least one positioning hole.

9. The waterway installation structure in the toilet according to claim 8,
    wherein the at least one positioning pin comprises two positioning pins respectively disposed on opposite sides of the mounting groove, and
    wherein the at least one positioning lug plate comprises two positioning lug plates respectively disposed on opposite sides of the module body.

10. The waterway installation structure in the toilet according to claim 7, the waterway installation structure further comprising:
    at least one base jaw disposed on the structural base and around the mounting groove,
    wherein the at least one base jaw is configured to be connected to the module body.

11. The waterway installation structure in the toilet according to claim 10,
    wherein the at least one base jaw comprises two base jaws respectively on opposite sides, and wherein the two base jaws are configured to be connected to the module body.

12. The waterway installation structure in the toilet according to claim 1, wherein one waterway joint of the at least two waterway joints is an inlet of the corresponding waterway module and the other waterway joint of the at least two waterway joints is an outlet of the corresponding waterway module.

13. A method for assembling a waterway installation structure, the method comprising:
respectively connecting at least two waterway joints of at least two waterway modules to at least two connection pipe joints of a connection module;
snapping at least two body jaws disposed on a top surface of a module body of the connecting module onto at least two limit blocks disposed on the at least two waterway joints; and
disposing the at least two waterway joints on the top surface of the module body; and
mounting the waterway installation structure to a toilet.

14. The method for assembling the waterway installation structure according to claim 13, the method further comprising:
connecting a seal ring between a waterway joint of the at least two waterway joints and a corresponding connection pipe joint of the at least two connection pipe joints.

15. The method for assembling the waterway installation structure according to claim 14,
wherein connecting the at least two waterway joints of the at least two waterway modules to the at least two connection pipe joints of the connection module comprising:
respectively inserting the at least two waterway joints into the at least two connection pipe joints, and
wherein connecting the seal ring between the waterway joint of the at least two waterway joints and the corresponding connection pipe joint of the at least two connection pipe joints comprises:
disposing the seal ring in a limit groove on an outer periphery surface of each of the at least two waterway joints.

16. The method for assembling the waterway installation structure according to claim 14,
wherein connecting the at least two waterway joints of the at least two waterway modules to the at least two connection pipe joints of the connection module comprising:
respectively inserting the at least two connection pipe joints into the at least two waterway joints, and
wherein connecting the seal ring between the waterway joint of the at least two waterway joints and the corresponding connection pipe joint of the at least two connection pipe joints comprises:
disposing the seal ring in a limit groove on an outer periphery surface of each of the at least two connection pipe joints.

17. The method for assembling the waterway installation structure according to claim 13, the method further comprising:
connecting the module body in a mounting groove of a structural base.

18. The method for assembling the waterway installation structure according to claim 17, the method further comprising:
inserting at least one positioning pin disposed on the structural base into at least one positioning hole of at least one positioning lug plate of the module body.

19. The method for assembling the waterway installation structure according to claim 18,
wherein the at least one positioning lug plate is disposed on an outside of the mounting groove when the at least one positioning pin passes through the at least one positioning hole.

20. The method for assembling the waterway installation structure according to claim 17, the method further comprising:
snapping at least one base jaw disposed on the structural base onto the top surface of the module body.

21. A waterway installation structure in a toilet, the waterway installation structure comprising:
a connection module comprising:
a module body comprising a watercourse; and
at least two connection pipe joints disposed on the module body and in fluid communication with the watercourse;
at least two waterway modules comprising:
at least two waterway joints configured to be respectively connected to the at least two connection pipe joints,
wherein the at least two waterway joints are configured to be respectively inserted into the at least two connection pipe joints, or
wherein the at least two connection pipe joints are configured to be respectively inserted into the at least two waterway joints;
a structural base comprising a mounting groove, wherein the module body is removably mounted in the mounting groove; and
at least one base jaw disposed on the structural base and around the mounting groove, wherein the at least one base jaw is configured to be connected to the module body.

* * * * *